June 15, 1954      L. S. REID      2,681,150
WATER SEPARATOR
Filed Dec. 24, 1949      2 Sheets-Sheet 1
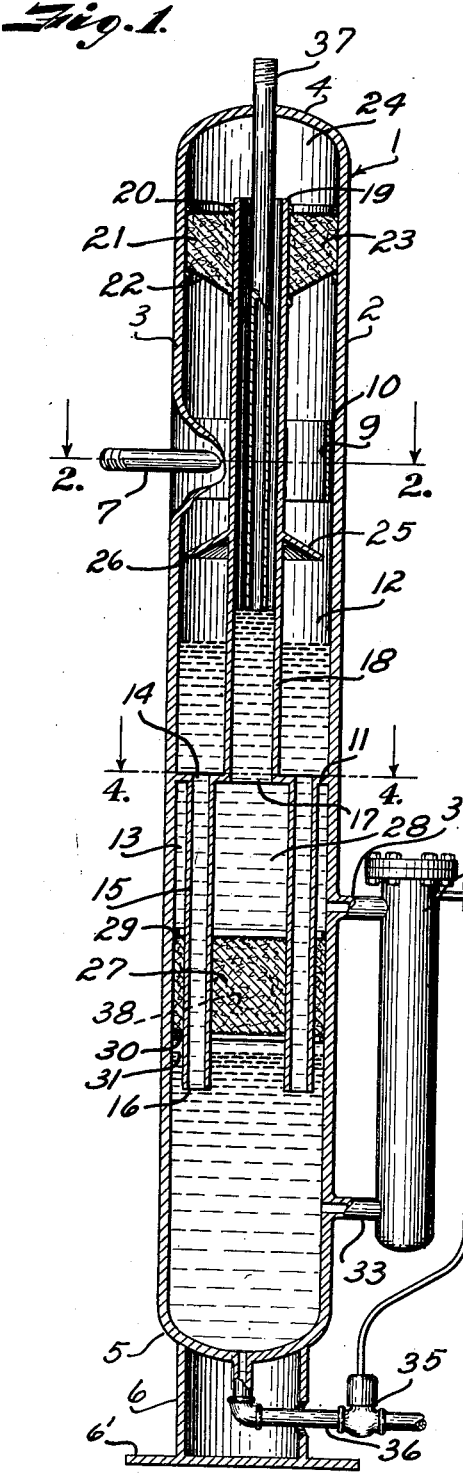
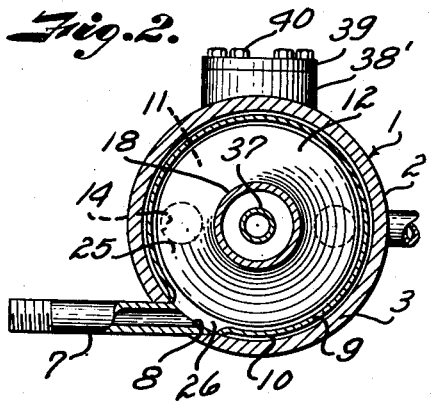
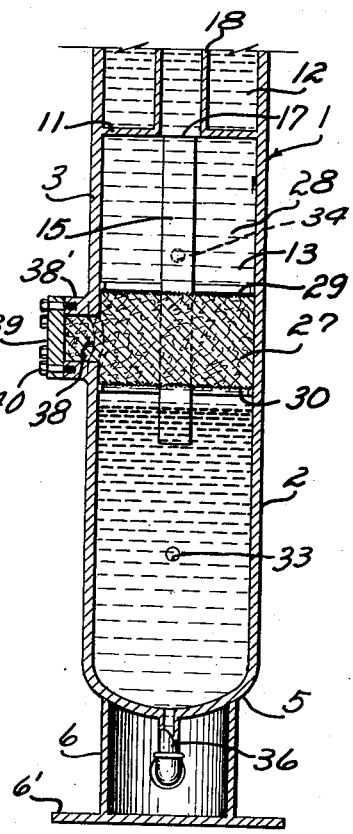
Inventor
Laurance S. Reid
By Fishburn & Mullendore
Attorneys

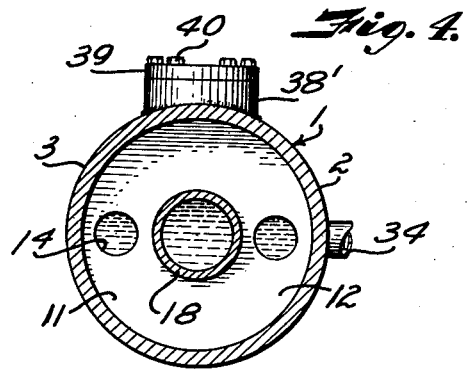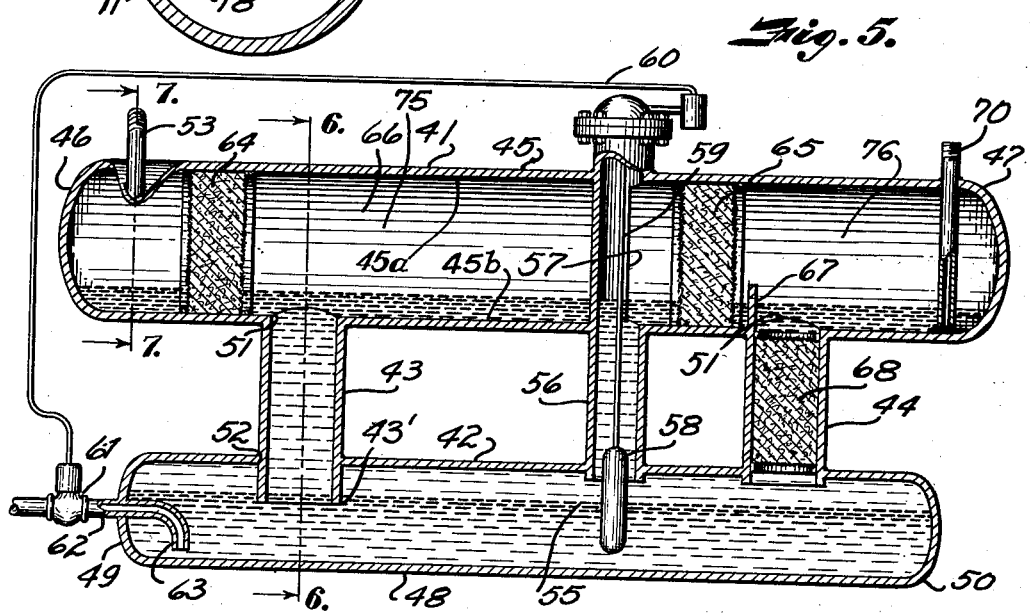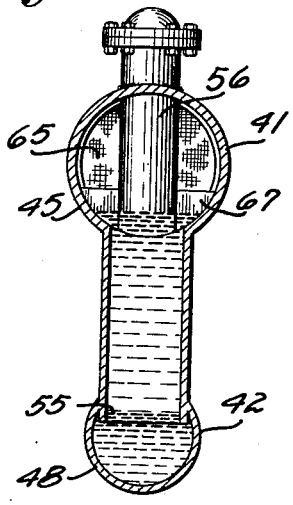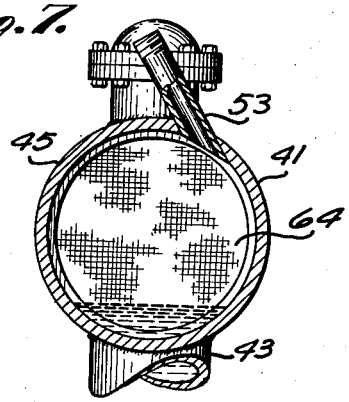
June 15, 1954 — L. S. REID — 2,681,150
WATER SEPARATOR
Filed Dec. 24, 1949 — 2 Sheets-Sheet 2
Inventor
Laurance S. Reid
By Fishburn & Mullendore
Attorneys Patented June 15, 1954

2,681,150

UNITED STATES PATENT OFFICE 2,681,150

WATER SEPARATOR

Laurance S. Reid, Norman, Okla.

Application December 24, 1949, Serial No. 134,977

12 Claims. (Cl. 210—44)

This invention relates to a separator particularly for separating water from a commingled stream of gas and liquid hydrocarbons, the principal object being to provide an apparatus of this character that is of simple construction and which requires only a single interface controller.

A further object of the invention is to provide a separator with means for effecting initial separation of the gas from the liquid components of the flow, mechanism for effecting separation of the water from the liquid hydrocarbon, and means for effecting discharge of the liquid hydrocarbon and gas in commingled flow.

Other objects of the invention are to provide a structure wherein all the liquid is caused to move downwardly below a baffle and rise vertically thereunder, so that reversal in direction of flow serves to accelerate separation of the water from the liquid hydrocarbon, to provide a filter section in the path of the upward flow to facilitate separation of the water and liquid hydrocarbon, and to provide ducts extending through the filter for conducting the mixed liquid downward without interference with the upward flow of separated hydrocarbon liquids.

In accomplishing these and other objects of the invention as hereinafter pointed out, I have provided improved structure, the preferred forms of which are illustrated in the accompanying drawings wherein:

Fig. 1 is a vertical section through a vertical separator constructed in accordance with the present invention.

Fig. 2 is a horizontal section through the separator on the line 2—2 of Fig. 1.

Fig. 3 is a vertical section through the lower portion of the separator taken at right angles to the section illustrated in Fig. 1.

Fig. 4 is a horizontal section through the separator on the line 4—4 of Fig. 1.

Fig. 5 is a vertical section of a horizontal form of separator constructed in accordance with the present invention.

Fig. 6 is a cross section on the line 6—6 of Fig. 5.

Fig. 7 is an enlarged section on the line 7—7 of Fig. 5.

Referring more in detail to the drawings and first to the structure illustrated in Figs. 1 to 4, inclusive:

1 designates a separator constructed in accordance with the present invention and which includes an elongated, vertically arranged vessel 2 having an annular wall 3 closed at the upper and lower ends by heads 4 and 5, the lower head 5 being supported on a collar 6 having a base plate 6' adapted for attachment to a suitable foundation. Connected with the wall 3 at a point spaced below the top of the vessel is an inlet duct 7. In carrying out the invention, it is proposed to initially separate all of the liquid from the gas constituent of the flow and to subsequently separate the hydrocarbon liquid and water after which the liquid hydrocarbon is recombined with the gas. Therefore, the mixed flow is admitted into the vessel to effect separation of the gas. This is accomplished by connecting the duct 7 to discharge tangentially within the vessel through an opening 8 for effecting circumferential flow against the inner surface of a band 9 that is spaced from the interface of the vessel to provide a passageway 10 therebetween for the downward flow of any liquid that may separate above the point of the inlet. Extending transversely of the vessel at a point below the inlet 7 is a partition 11 dividing the vessel into an upper gas and liquid separation chamber or compartment 12 and a lower liquid separating chamber or compartment 13. The head 4 forms the top and the partition 11 the bottom of the upper compartment. The partition has diametrically spaced openings 14 in connection with the upper ends of downflow tubes or ducts 15 that are connected with the plate and have their lower ends 16 discharging at a point above the bottom of the vessel. Formed centrally of the partition 11 is an opening 17 having connection with a tube or partition 18 that extends upwardly therefrom and which has its upper end 19 spaced below the head 4 and supported by a spider 20. Carried by the upper end of the tube or partition 18 and the wall of the vessel is a mist extractor 21 which may comprise a bottom screen 22 supporting a bed 23 of ceramic or other material to provide contact surface for collecting any liquid spray or mist that is carried upwardly by the separated gas into a gas collecting space 24 from where the gas travels downwardly through the tube 18, as later described. Carried by the tube 18 at a point between the inlet 7 and the partition 11 is a downwardly and outwardly flaring baffle 25 having the periphery thereof spaced from the wall 3 of the vessel to provide an annular passageway 26 therebetween for passing liquid components of the flow.

Supported within the vessel below the partition 11 is a filter bed 27 which may comprise hay, excelsior or any other similar material to restrict upward flow of free water into a liquid hydrocarbon collecting space 28 which surrounds the upper portions of the downflow tubes or ducts 15 and which extends into the lower end of the tube 18 through the opening 17. The tube or partition 18 thus divides the upper compartment into a hydrocarbon liquid collecting space on the inner side of the tube and a space on the outer side for collecting the liquid components of the flow, as shown in Fig. 1. The filter bed 27 is supported between spaced screens 29 and 30 having openings therein through which the downflow tubes extend.

In order to maintain the interface 31 between the water and hydrocarbon liquid at proper level, the separator is provided with any standard interface level controller 32 that has flow connections 33 and 34 with the water and liquid hydrocarbon containing spaces of the filter, as shown in Fig. 1, and which is operatively connected with a valve 35 in a discharge pipe 36 leading from the bottom of the vessel.

The gas is discharged from the separator through an outlet pipe 37 extending through the upper head 4 and depending coaxially within the tube 18 to terminate at or slightly below the hydrocarbon liquid level to be carried within the tube 18, so that the gas lifts the liquid hydrocarbon for admixture and discharge therewith. To facilitate insertion and removal of the filtering material, the wall of the vessel may be provided between the screens 29 and 30 with an opening 38 that is encircled by a collar 38' and which carries a closure plate 39 that is secured by fastening devices such as bolts 40.

In using the separator constructed and assembled as described, the commingled fluids from which the water component is to be removed are admitted through the inlet duct 7 under sufficient pressure to effect circumferential movement thereof about the band 9 and cause centrifugal separation of the liquid components from the gas component of the flow. The liquid components being the heavier portions of the flow, spiral outwardly and downwardly, and are discharged onto the baffle 25 for downward flow through the annular passageway 26. The gas being the lighter component of the flow, rises upwardly around the tube 18 and passes through the mist extractor where any entrained liquid or mist is separated to gravitate to the lower portion of the vessel while the gas travels upwardly into the gas collecting space 24 for a downward flow through the tube 18 and upward flow through the outlet duct or pipe 37. The liquid components of the flow travel downwardly through the downflow tubes 15 and collect on the bottom head 5 from where the hydrocarbon liquid rises upwardly in the space surrounding the outlets of the downflow tubes 15 and upwardly through the filter bed to accumulate within the lower end of the tube 18 until the level reaches the inlet of the gas outlet pipe. Upon reversal of the flow direction from the lower ends of the downflow tubes 15 the water component of the flow gravitates to the lower portion of the vessel so that only the liquid hydrocarbons move upwardly through the filter bed and collect under the partition and within the lower end of the tube 18 up to the inlet of the discharge pipe 37. The liquid interface controller 32 is regulated so that the interface level of the liquids designated 31 is maintained slightly below the filter bed. When the level of the liquid hydrocarbon reaches the inlet of the outlet pipe 37, the action and flow velocity of the gas lifts the liquid hydrocarbon and discharges the liquid hydrocarbon therewith, thereby substantially maintaining the original hydrocarbon content of the original flow.

Fig. 5 illustrates adaptation of the invention to a horizontally disposed apparatus which includes upper and lower horizontally disposed vessels 41 and 42 that are interconnected by means of tubes or ducts 43 and 44. The upper vessel 41 comprises a cylindrical shell 45 having closed ends 46 and 47. The upper arcuate wall portion 45a of the shell 45 forms a top wall portion for the upper vessel or compartment 41 and the lower arcuate wall portion 45b of the shell 45 forms a bottom wall portion thereof, the wall portions 45a and 45b corresponding respectively to the top wall 4 and the bottom wall 11 of the embodiment shown in Fig. 1. The lower vessel 42 may be of smaller diameter, as shown, and includes a cylindrical shell 48 having closed ends 49 and 50. The tubes 43 and 44 are secured within openings 51 that are provided in the lower side of the upper shell and extend through similar openings 52 and in the upper portion of the lower shell. The mixed fluids are delivered tangentially into the end of the upper vessel 41 through a pipe 53 to effect centrifugal separation of the liquid and gas which separated fluids flow toward the opposite end of the vessel and the liquid travels downwardly through the tube 43 to fill the lower vessel, the hydrocarbon liquid floating upon the water, or heavier liquid. The tube 43 terminates substantially at the interface surface level 55 of the separated liquids, as indicated at 43', but the tube 44 terminates somewhat above the interface level to provide inlet for hydrocarbon liquid in the vessel 42. The vessels are also interconnected by means of a tube 56 that extends entirely through the upper vessel and into the lower vessel a distance corresponding to the terminal of the tube 44. The portion of the tube 56 extending through the upper vessel is cut away on the downstream side, as indicated at 57, to permit flow of liquid to and from the respective vessels and provide a float chamber for a float 58 that is adapted to rise and fall with any change in level of the liquid interface indicated at 55. The upper end of the float chamber tube projects through the top of the upper vessel and houses an actuating mechanism which is connected with the float by means of a rod 59 and which is also operatively connected by a duct 60 leading to a pressure actuated control valve 61 in a water discharge pipe 62. The pipe 62 is connected with the closed end 49 of the lower vessel and terminates in a downwardly extending inlet 63 through which water is discharged from the vessel when the valve is opened by the float.

Extending transversely within the upper vessel 41 between the closed end 46 and the downflow 43 is a filter 64 which cooperates with a spray extractor 65 at the opposite end of the vessel to provide a substantially long flow path 66 for the gas and liquid hydrocarbon to assure settling out of the water. The upper vessel is also provided with a transverse partition 67 that extends upwardly from the bottom wall portion 45b of the vessel 41 at a point ahead of the tube or duct 44 to divide the vessel 41 into the spaces 75 and 76, the space 75 on one side of the partition 67 constituting a space for separating the gas and liquid components and collecting the liquid components of the incoming flow and the space 76 on the other side of the partition 67 constituting a hydrocarbon liquid collecting space in which the hydrocarbon liquid collects for discharge from the vessel as later described. The partition 67 insures down flow of the oil and water through the duct 43 to the lower vessel or compartment 42 and since the partition 67 terminates short of the top wall portion 45a of the vessel 41 a common gas space is provided which extends over both of the liquid collecting spaces 75 and 76. The separated hydrocarbon liquid upon running through the tube 44 discharges into the hydrocarbon liquid collecting space of the upper vessel. The hydrocarbon liquid is discharged from the upper vessel 41 through a pipe 70 along with the gas.

In operation, the mixed stream of liquids and gas is delivered through the pipe 53 into the upper vessel and the liquid separates and drops to the lower portion of the upper vessel where it flows longitudinally thereof through the filter 64 and downwardly through the tubes 43 and 56 where the water separates and the hydrocarbon liquid rises upwardly through the filter containing tube 44, so that only hydrocarbon liquid reaches the portion of the vessel into which the gas discharge pipe 70 depends. The separated gas travels along the upper portion of the upper vessel and passes through the spray extractor and downwardly for upward flow through the discharge pipe 70 so that it picks up the hydrocarbon liquid and carries it as a mixture therewith. The water collecting in the lower vessel is discharged through the pipe 62 whenever the valve 61 is opened by the float actuated mechanism.

It is obvious that I have provided a water separator wherein the water and liquid hydrocarbons are readily removed from the gas component of a flow and wherein the liquid hydrocarbons after being readily separated from the water are returned to be picked up by the gas component of the original stream, thereby maintaining the same hydrocarbon value of the original stream.

What I claim and desire to secure by Letters Patent is:

1. An apparatus for separating water from a mixed flow of hydrocarbon liquid, gas and water, including a horizontally disposed elongated vessel having an inlet for said mixture at one end including means for effecting centrifugal separation of the gas component from the liquid components of the flow, a lower horizontally disposed vessel, a downflow tube connecting the vessels for conducting the liquids from the lower portion of the upper vessel into the lower vessel, an upflow tube connecting the opposite ends of the vessels for return of separated hydrocarbon liquid to the upper vessel for readmixture with the hydrocarbon gas, a partition extending transversely within the upper vessel intermediate the connections of the downflow tube and the upflow tube to prevent recontact of the separated hydrocarbon liquid with the mixed liquid components, means connected with the upper vessel for discharging said hydrocarbon gas and liquid mixture, and a water discharge connection with the lower vessel.

2. An apparatus for separating water from a mixed flow of hydrocarbon liquid, gas and water, including a horizontally disposed elongated vessel having an inlet for said mixture at one end in which the gas component separates from the liquid components of the flow, a lower horizontally disposed vessel, a downflow tube connecting the vessels for conducting the liquids from the lower portion of the upper vessel into the lower vessel, an upflow tube connecting the opposite ends of the vessels for return of separated hydrocarbon liquid to the upper vessel, a partition extending transversely within the lower portion of the upper vessel at a point intermediate the connections of said down and up flow tubes to prevent recontact of the separated hydrocarbon liquid with said liquid components, means connected with the upper vessel for discharging said hydrocarbon gas and separated hydrocarbon liquid, a water discharge connection with the lower vessel, and a water repellent in said upflow tube.

3. An apparatus for separating water from a mixed flow of hydrocarbon liquid, gas and water, including a horizontally disposed elongated vessel having an inlet for said mixture at one end including means for effecting centrifugal separation of the gas component from the liquid components of the flow, a lower horizontally disposed vessel, a downflow tube connecting the vessels for conducting the liquids from the lower portion of the upper vessel into the lower vessel, an upflow tube connecting the opposite ends of the vessels for return of separated hydrocarbon liquid to the upper vessel for readmixture with the hydrocarbon gas, a partition extending transversely within the lower portion of the upper vessel at a point intermediate the connections of said down and up flow tubes to prevent recontact of the separated hydrocarbon liquid with said liquid components, means connected with the upper vessel for discharging said hydrocarbon gas and liquid mixture, a water discharge connection with the lower vessel, a shut off valve controlling said water discharge, and an interface controller including a float within the lower vessel and having connection with said valve.

4. An apparatus for separating water from a mixed flow of hydrocarbon liquid, gas, and water including, a horizontally disposed elongated vessel providing a gas separating space along the length of the upper portion of said vessel and having an inlet at one end of said space for admitting the mixture into the vessel, a transverse partition dividing the lower portion of said horizontally disposed vessel to form a collecting space at the inlet end for the separated liquids and a hydrocarbon liquid collecting space at the other end of the vessel, said liquid collecting spaces being directly connected with the gas separating space, a lower horizontally disposed vessel, a down flow duct connecting the vessels for conducting the mixed liquids from the liquid collecting space at the inlet end of the upper vessel into the lower vessel, an up flow duct connecting the opposite end of the lower vessel with said hydrocarbon liquid collecting space in the upper vessel for conducting separated hydrocarbon liquid from the lower vessel to the hydrocarbon liquid collecting space in the upper vessel, a pipe having a downwardly opening inlet within the hydrocarbon liquid collecting space for forming an outlet for the separated gas and hydrocarbon liquid, a water discharge connection with the lower vessel, and a transverse contact bed within the upper vessel between the inlet and said down flow duct for removing spray from gas moving through said gas separating space.

5. An apparatus for separating water from a mixed flow of hydrocarbon liquid, gas, and water including, a horizontally disposed elongated vessel providing a gas separating space along the length of the upper portion of said vessel and having an inlet at one end of said space for admitting the mixture into the vessel, a transverse partition dividing the lower portion of said horizontally disposed vessel to form a collecting space at the inlet end for the separated liquids and a hydrocarbon liquid collecting space at the other end of the vessel, said liquid collecting spaces being directly connected with the gas separating space, a lower horizontally disposed vessel, a down flow duct connecting the vessels for conducting the mixed liquids from the liquid collecting space at the inlet end of the upper vessel into the lower vessel, an up flow duct connecting the opposite end of the lower vessel with said hydrocarbon liquid collecting space in the upper vessel for conducting separated hydrocarbon liquid from the lower vessel to the hydrocarbon liquid collecting space in the upper vessel, a pipe having a downwardly opening inlet within the hydrocarbon liquid collecting space for forming an outlet for the separated gas and hydrocarbon liquid, a water discharge connection with the lower vessel, a transverse contact bed within the upper vessel between the inlet and said down flow duct for removing spray from gas moving through said gas separating space, and a second contact bed extending transversely of the upper vessel between the down flow and up flow ducts for removing any remaining spray from the separated gas.

6. An apparatus for separating water from a mixed flow of hydrocarbon liquid, gas, and water including, a horizontally disposed elongated vessel providing a gas separating space along the length of the upper portion of said vessel and having an inlet at one end of said space for admitting the mixture into the vessel, a transverse partition dividing the lower portion of said horizontally disposed vessel to form a collecting space at the inlet end for the separated liquids and a hydrocarbon liquid collecting space at the other end of the vessel, said liquid collecting space being directly connected with the gas separating spaces, a lower horizontally disposed vessel, a down flow duct connecting the vessels for conducting the mixed liquids from the liquid collecting space at the inlet end of the upper vessel into the lower vessel, said down flow duct having an outlet depending into the lower vessel below the interface to be carried within the lower vessel, an up flow tube connecting the opposite end of the lower vessel with said hydrocarbon liquid collecting space for return of separated hydrocarbon liquid from the lower vessel to the hydrocarbon liquid collecting space in the upper vessel, a pipe having a downwardly opening inlet within the hydrocarbon liquid collecting space for forming an outlet for the separated gas and hydrocarbon liquid from the upper vessel, and a water discharge connection with the lower vessel including means for maintaining said interface level.

7. An apparatus for separating water from a commingled flow of hydrocarbon liquid and gas, including means forming an upper gas and liquid separating compartment and a lower water and hydrocarbon liquid separating compartment, said upper compartment having top and bottom wall portions, a partition connected with said bottom wall portion and extending upwardly within said upper compartment but terminating short of said top wall portion and providing a hydrocarbon liquid collecting space at one side and a space on the other side for collecting liquid components of said flow, a duct interconnecting the compartments for conducting said liquid components from the upper compartment into the lower compartment for gravity separation of water from the hydrocarbon liquid, said lower compartment and the hydrocarbon liquid collecting space of the upper compartment being interconnected for flow of separated hydrocarbon liquid from the lower compartment into the hydrocarbon liquid collecting space of the upper compartment, a gas discharge duct having an inlet located in the hydrocarbon liquid collecting space and below the top of the upper compartment for discharge of the hydrocarbon liquid and to maintain a gas space above said collecting liquids, an inlet duct for admitting the commingled flow and having discharge into the gas space above the level of the inlet to the discharge duct and on the side of the partition over the space in which the liquid components of the flow collect, and means for discharging the separated water from the lower compartment.

8. An apparatus for separating water from a commingled flow of hydrocarbon liquid and gas in accordance with claim 7, wherein the inlet of the gas discharged duct opens downwardly within the separated hydrocarbon liquid in said hydrocarbon liquid collecting space for induction of the hydrocarbon liquid in commingled flow with the gas.

9. An apparatus for separating water from a commingled flow of hydrocarbon liquid and gas in accordance with claim 7 and including an interface controller in the water discharge means for controlling the water discharge to maintain a uniform liquid interface in the lower compartment between the separated water and the hydrocarbon liquid.

10. An apparatus for separating water from a commingled flow of hydrocarbon liquid and gas in accordance with claim 7, and including a contact bed in the path of the hydrocarbon liquid returned to the hydrocarbon liquid collecting space of the upper compartment for preventing entrainment of water with said separated hydrocarbon liquid.

11. An apparatus for separating water from a commingled flow of hydrocarbon liquid and gas, including a vertically disposed elongated vessel having a transverse partition intermediate the top and bottom thereof and forming an upper gas and liquid separating compartment and a lower water and hydrocarbon liquid separating compartment within said vessel, said partition cooperating with the upper end of the vessel in forming the top and bottom of said upper compartment, a tubular partition connected with the transverse partition and extending upwardly within said upper compartment but terminating short of said top and providing a hydrocarbon liquid collecting space within said tubular partition and a surrounding space for collecting liquid components of said flow, a duct connected with said surrounding space and depending into the lower compartment for conducting the liquid components of the flow into the lower compartment for gravity separation of water from the hydrocarbon liquid, said partition having an opening between the lower compartment and the space within said tubular partition through which the separated hydrocarbon rises into the hydrocarbon liquid collecting space, a discharge duct having an inlet end located in the hydrocarbon liquid collecting space and below the top of the upper compartment for discharge of the hydrocarbon liquid and to maintain a gas space above said collecting liquids, an inlet duct connected with a vessel for admitting the commingled flow and having discharge within the gas space above the inlet of the discharge duct and the space in which the liquid components of the flow collect, and means for discharging the separated water from the lower compartment.

12. An apparatus for separating water from a commingled flow of hydrocarbon liquid and gas, as described in claim 11, and a mist extractor in the upper compartment intermediate the space in which the liquid components of the flow collect and the space within the tubular partition to prevent the passage of liquid components to the hydrocarbon liquid collecting space without passing through the lower liquid separating compartment.

References Cited in the file of this patent

UNITED STATES PATENTS

| Number | Name | Date |
|---|---|---|
| 1,468,193 | Carter | Sept. 18, 1923 |
| 1,516,132 | Allen et al. | Nov. 18, 1924 |
| 1,947,709 | Garrison et al. | Feb. 20, 1934 |
| 2,009,646 | Brady | July 30, 1935 |
| 2,179,131 | Millard | Nov. 7, 1939 |
| 2,224,345 | Heathman et al. | Dec. 10, 1940 |
| 2,457,959 | Walker | Jan. 4, 1949 |
| 2,507,273 | Schultz | May 9, 1950 |